(12) United States Patent
Winterot et al.

(10) Patent No.: US 9,344,650 B2
(45) Date of Patent: May 17, 2016

(54) METHOD FOR CALIBRATING A DIGITAL OPTICAL INSTRUMENT AND DIGITAL OPTICAL INSTRUMENT

(71) Applicant: Carl Zeiss Microscopy GmbH, Jena (DE)

(72) Inventors: Johannes Winterot, Jena (DE); Thomas Milde, Jena (DE); Max Funck, Weimar (DE); Toufic Jabbour, Aalen (DE); Johannes Knoblich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 106 days.

(21) Appl. No.: 14/448,425

(22) Filed: Jul. 31, 2014

(65) Prior Publication Data

US 2015/0036027 A1 Feb. 5, 2015

(30) Foreign Application Priority Data

Aug. 3, 2013 (DE) .......................... 10 2013 012 987

(51) Int. Cl.
*H04N 5/357* (2011.01)
*H04N 5/232* (2006.01)
(Continued)

(52) U.S. Cl.
CPC .............. *H04N 5/357* (2013.01); *G02B 21/365* (2013.01); *H04N 5/23296* (2013.01); *H04N 5/3572* (2013.01); *H04N 17/002* (2013.01)

(58) Field of Classification Search
CPC .................................................. G01B 9/02088
USPC ........................................................ 348/79
See application file for complete search history.

(56) References Cited

U.S. PATENT DOCUMENTS 7,068,426 B2 6/2006 Bruehl et al.
8,964,285 B2 * 2/2015 Kajitani ................. G02B 21/02
359/368

(Continued)

FOREIGN PATENT DOCUMENTS

DE       101 14 757 B4    10/2001
DE       102 25 193 B4     1/2004
DE  10 2010 025 888 A1     1/2012

OTHER PUBLICATIONS

European Search Report for Patent No. 14178685.5-1562, Dated Dec. 18, 2014.

(Continued)

*Primary Examiner* — Anthony J Daniels
(74) *Attorney, Agent, or Firm* — Nixon Peabody LLP; Jeffrey L. Costellia

(57) ABSTRACT

The invention relates to a method for calibrating an optical instrument which comprises at least a motorized zoom system, an objective, an image sensor and an image processing unit. The method comprises the following steps: establishing calibration data $D_{ZRef}$ of the zoom system with a reference objective and storing these in an internal memory of the zoom system; establishing calibration data $D_{ORef}$ of the objective with a reference zoom system and storing these in an internal memory of the objective; reading the internal memories of the zoom system and of the objective and applying a digital-optical correction of an image acquired by an image sensor with the calibration data $D_{ZRef}$ and $D_{ORef}$. The invention moreover relates to an optical instrument, in particular a digital microscope, to which the calibration method according to the invention can be applied.

10 Claims, 2 Drawing Sheets

(51) Int. Cl.
   *G02B 21/36* (2006.01)
   *H04N 17/00* (2006.01)

(56) References Cited

U.S. PATENT DOCUMENTS

2001/0028391 A1   10/2001   Iko

| | | | |
|---|---|---|---|
| 2002/0041383 A1* | 4/2002 | Lewis, Jr. | H04N 5/217 358/1.9 |
| 2014/0029000 A1* | 1/2014 | Jiang | G01M 11/02 356/125 |
| 2014/0362186 A1* | 12/2014 | Ji | G01C 11/02 348/46 |

OTHER PUBLICATIONS

German Search Report.

* cited by examiner

METHOD FOR CALIBRATING A DIGITAL OPTICAL INSTRUMENT AND DIGITAL OPTICAL INSTRUMENT

TECHNICAL FIELD

The invention relates to a method for calibrating an optical instrument, in particular for digital microscopes and modular optical systems, which comprise independent zoom systems and, optionally, objectives. Additionally, the invention relates to a digital microscope or a digital optical system, in which such a method is implemented or which is suitable for the application of a method according to the invention.

SUMMARY OF THE INVENTION

Production tolerances of the optical components, that is to say of the zoom systems and of the objectives, cause aberrations in the image representation, whether this be the actual magnification of an objective or of the specific zoom setting, a deviation of the image steadiness from the center, image distortions, color aberrations or other aberrations.

Aberration means that the various light rays emanating from the object point are not all focused on an image point. The most important aberrations are spherical aberration and chromatic aberration. Spherical and chromatic aberrations are corrected by systems made of a plurality of lenses of different glass types; spherical aberrations are corrected by aspherical lenses or gradient lenses. A person skilled in the art is aware of further correction options, for example aplanatic lenses, splitting of lenses for reducing angles of incidence, glass types with a higher refractive index, reducing the pupil and other options. By way of example, a glass plate (plane plate) generates an image-plane offset or unsharpness which increases with increasing aperture angle.

Imaging by lenses is always error-prone to a greater or lesser extent. By way of example, color fringes or the so-called field curvature are created in the microscopic image. Such aberrations can largely be excluded by skillful setup of the objectives. Plan achromats and apochromats are examples of this. In the case of apochromatic objectives, color fringes in the microscopic image are suppressed by a complicated arrangement of different lenses in the objective. The plan achromats are corrected in such a way that the field curvature, which usually occurs in the microscopic image, is eliminated.

Of all objectives, the plan apochromats have the most complicated design. In these objectives, the field curvature is largely removed, like in the case of plan achromats. Additionally, the usually occurring red and blue color fringes are suppressed in these objectives by the very complicated design. These objectives are very expensive and are primarily used in color micro-photography with the highest demands.

In zoom systems, there additionally are aberrations as a result of centering differences of the zoom design (image steadiness errors). Moreover, the aforementioned aberrations can vary over the zoom range.

Manufacturing tolerances in particular play a large role in the quality of the imaging. In the case of digital microscopes with modular design, aberrations can add up as a result of in particular, the zoom system and objective optical components and the respective tolerances thereof.

DE 102 25 193 A1 has disclosed a method for calibrating the magnification of the stereo microscope, in which a calibration over the whole magnification range should be able to be derived on the basis of a first calibration. With an objective/eyepiece reference measurement pair, predetermined actual magnifications are set on the microscope by actuating the zoom. The positions of the individual lenses of the zoom, present in this case, are registered and a nominal magnification value is stored for each zoom setting. A correction factor is calculated by a computational comparison between the actual magnification and the nominal magnification, which correction factor is used for calibrating the whole zoom range. This merely relates to a correction in respect of the real magnification.

In digital photography, objective distortions can be corrected manually by means of e.g. software, wherein comprehensive databases for cameras and objectives must be available. Objective corrections (distortions, chromatic aberrations and vignetting) are in part carried out internally using the firmware of the cameras (e.g. Sony).

DE 101 14 757 B4 describes a microscope system with a zoom optical unit and a digital camera. The digitally photographed image is corrected in a correction unit (PC) in correspondence with image correction data corresponding to the respective magnification. Here, the image correction data are photographic image data of a standard background image. An exclusive OR function corresponding to the object image and the standard background image is carried out for each pixel.

DE 10 2010 025 888 A1 has disclosed a digital camera with an implemented method for creating a distortion-free digital image, which enables an ideal image distortion adapted to the respectively present camera objective. In the method, correction values for each type of camera objective are determined once experimentally and subsequently stored in all digital cameras with the same objective type. Here, the distortion function is dependent on the set focal length and the distance of an object to be recorded and can be established as a two-dimensional matrix made of constants and stored in the digital camera. Here, the factors can be established by interpolation from the stored matrix.

US 2008/0239107 A1 and US 2009/0268078 A1 have disclosed distortion correction methods for digital cameras, in which coefficients depending on zoom and focus settings are stored in a table. During the correction, intermediate values are established by interpolation with higher order polynomials.

In digital microscopy and other digital optical applications, an objective and zoom system can often be configured between themselves if the zoom is not directly integrated into the objective. That is to say, a zoom system can be used with different objectives. Since both zoom system and objective cause different aberrations, different corrections are required to arrive at a satisfactory image quality.

The invention is based on the object of specifying a method for calibrating a digital microscope or a different optical system, which method in particular simplifies the manufacturing process of modular systems and enables a quick and simple calibration in respect of different aberrations when an objective is changed. Furthermore, the provision of a digital microscope with such a calibration logic is sought after.

The object is achieved by a method comprising the features of claim 1 and by a digital microscope comprising the features of claim 10.

The method according to the invention targets the goal of arriving at a calibrated overall system in a simple and particularly fast manner by means of a suitable individual calibration of the modular components of a digital microscope (with at least a zoom system and an objective as optical modules) with a reference object in each case.

A precondition is the assignment of the individual calibrations to arbitrary positions of the zoom system. This is possible by means of the drive of the zoom system if the zoom system is motorized or encoded in the stepper mode.

Here, the method comprises the following steps:

Establishing calibration data $D_{ZRef}$ of the zoom system with a reference objective and storing the calibration data $D_{ZRef}$ in an internal memory of the zoom system.

In a further step, establishing calibration data $D_{ORef}$ of the objective with a reference zoom system and storing the calibration data $D_{ORef}$ in an internal memory of the objective is brought about. Subsequently, the calibration data $D_Z$ and $D_O$ are combined by a suitable digital-optical correction of an image acquired by the image sensor. This may be a mathematical operation related to a coordinate transform.

Initially, the step of establishing the calibration data $D_{ZRef}$ of the zoom system is to be explained on the basis of a particularly preferred embodiment of the digital microscope.

The digital microscope comprises at least an objective, an (often or usually) motorized zoom system, an image sensor and a logic unit for image processing or an image processing unit. The logic unit is preferably arranged together with the zoom system in a so-called optical engine, where one or more drive controls for the zoom system and further control and evaluation components are also housed. The objective is arranged in an interchangeable manner on the optical engine. The objective advantageously comprises its own memory and an electronic interface by means of which this memory can be read.

Naturally, the digital microscope also comprises, in a manner known per se, a control unit for actuating the microscope components and an input/output unit for operation, image observation and image evaluation. It goes without saying that monitor, keyboard and operating components as input/output units in the case of a digital microscope can also be available as separate components which are connected to the digital microscope.

Likewise, the digital microscope comprises an object stage, which can be displaced in a motor-driven manner, an optionally pivotable stand, an illumination device for episcopic illumination and optionally for diascopic illumination, and further components not mentioned here.

Since the zoom system and objective are different optical modules with different tolerances and aberrations, and the production thereof optionally takes place in a decentralized manner, a separate calibration is called for. However, the method can also be used advantageously in a subsequent interchange of the objective or of the optical engine.

During the production of the optical engine (image processing unit), which contains the motorized zoom system, the real zoom curve thereof for defined motor increments of optionally a plurality of motors for a plurality of lens assemblies is determined. Furthermore, the actual aberrations of the zoom system, such as image steadiness, aperture control and distortion correction, are established and, finally, a model is established from this for magnification control and image correction. According to the invention, this calibration is performed for all new to be produced systems on the basis of the reference objective. This ensures that each zoom system is always calibrated in the same manner.

After the objectives are produced, these are uniformly calibrated on a reference zoom system. In the process, a real magnification in combination with the reference zoom system is established.

Advantageously, calibration data of the reference zoom system with a reference objective are also acquired and stored.

If the objective in the digital microscope is subsequently interchanged, the stored calibration data of the zoom system can be used for a shortened recalibration using the calibration data stored on the objective and the known reference data.

A first calibration when assembling the optical system is very simple on the basis of the calibration on a reference object in each case.

In particular, the advantages of the invention should be seen in that any system can also be combined and calibrated with any number of objectives such that the modular components can be produced in a decentralized manner and yet an unchanging and high-quality calibration is ensured.

Naturally, the calibration process itself can be varied and adapted according to requirements.

The invention will be explained in more detail below for a particularly preferred embodiment on the basis of the figures.

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification and the spirit and scope of the teachings herein.

In the drawings, where like reference numerals refer to like reference in the specification:

DETAILED DESCRIPTION

Figure 1:
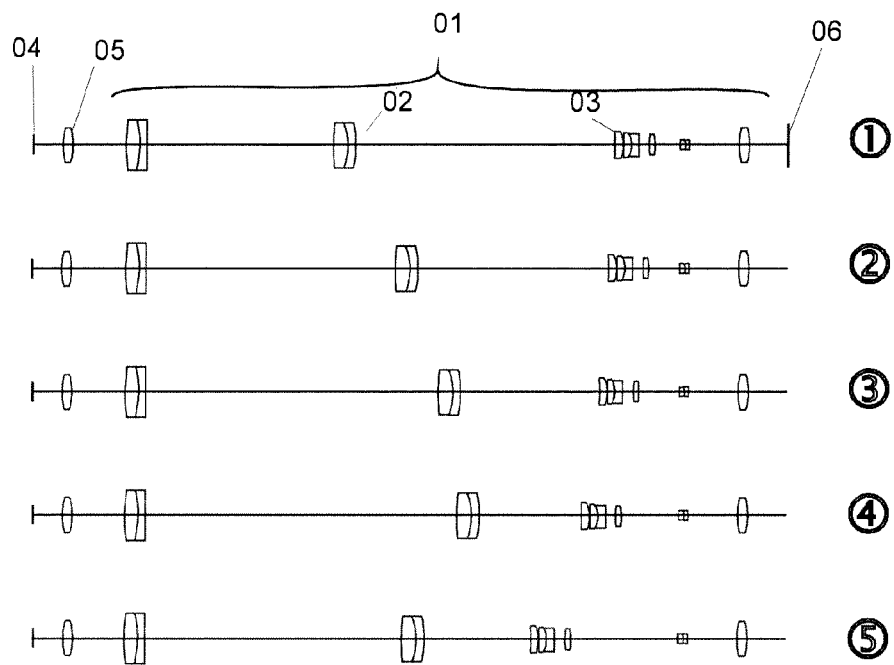
FIG. 1 shows a schematic illustration of a zoom system with movable lens groups in different positions.

FIG. 1 shows a schematic illustration of a zoom system 01 with two movable lens groups and one fixed lens group in various positions. A first movable lens group 02 initially serves for setting the focus while a second lens group 03 sets the magnification factor β. The lens groups 02, 03 can be displaced in extremely small steps by means of stepper motors (not depicted here). During operation of the digital microscope. there are fixed zoom tables, which store the respective motor positions of the two lens groups. Both motors are preferably put into motion simultaneously in order to arrive at a desired zoom setting particularly quickly. In a manner known per se, the zoom system 01 is arranged in the beam path from an object 04 to an image sensor 06 via an objective 05 and the zoom system 01.

In order to establish calibration data $D_Z$ of the zoom system 01 with a reference objective, the objective (e.g. a 5×0.3 objective with installed object plane) is, in a preferred embodiment of the method, initially focused in an assembled digital microscope using only zoom movements near a high magnification (with the first lens group 02).

The installed object plane described here is a mechanical device by means of which a reference object can be placed in front of the objective 05 at the working distance.

Subsequently, the objective 05 is replaced by a reference objective 06 of the same type and with the same magnification (also referred to as golden objective), without moving the zoom.

Figure 2:
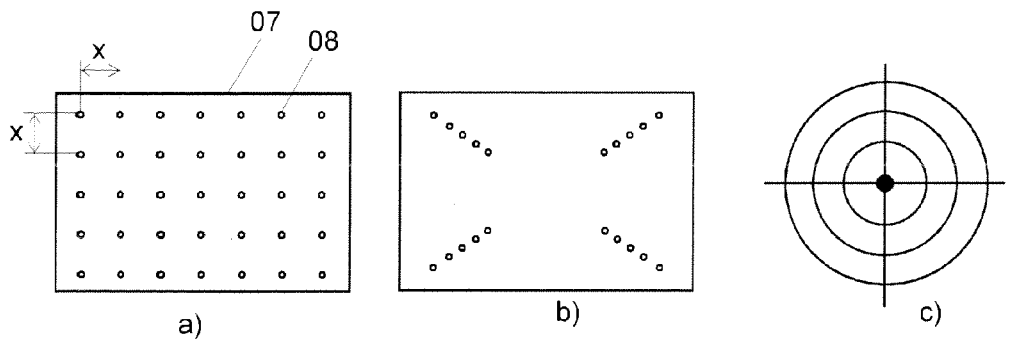
FIG. 2 shows a schematic illustration of various reference patterns.

Subsequently, an actual image center point on the sensor face (fixed point) is established, which may deviate from the sensor center point both in terms of absolute position and orientation due to the non-adjusted sensor assembly and the centering tolerances of the optical unit. This image center point is of importance, in particular for zooming, to ensure that the image is depicted zoomed from precisely one point (and zoomed into precisely one point). Advantageously, the image center is established using a reference pattern on the basis of second zoom settings and the deviation when zooming is minimized. A particularly stable image center point is obtained if use is made of two far-apart zoom settings (i.e. largest and smallest magnification). By way of example, crosshairs or a diagonal pattern (FIGS. 2c, 2b) can be used as a reference object for determining the image center point. The fixed point is selected as center point of the sensor face to be evaluated for the calibration. The projection thereof on the object plane should then correspond to the center point of the calibration patterns of FIG. 2.

In order to determine a zoom curve, preferably nine zoom settings are approached in succession and the focus is set. In this case, only five zoom settings ① to ⑤ are depicted. By way of example, the setting can be brought about by virtue of a zoom setting being approached by means of the second movable lens group 03 and a reference pattern being focused with the first movable lens group 02. To this end, use can be made of a grid reference object 07 depicted in FIG. 2a, which should optionally be kept available in as many different sizes as zoom settings are to be approached. Alternatively, a very finely gridded reference object can be used if it is certain that the required deviation values can be established in each zoom setting.

In the depicted example, the grid reference object 07 is a perforated mask with holes 08 which, with a defined size, are arranged at equidistant distances x as rows and columns on a plate. An actually set magnification $\beta$ can be calculated from the known distances x of the holes 08 on the grid reference object 07 and the representation on the image sensor 06. This may, furthermore, already contain a distortion correction, which will be explained in more detail below.

In addition to determining the zoom curve, a distortion correction model is preferably also established, with the aid of which chromatic aberrations and distortions of the optical unit can be corrected digitally.

Thus, the result from determining the zoom curve is a table in which magnifications $\beta$, motor positions and, optionally, correction coefficients for distortion and image steadiness (for a zoom system on the golden objective) are stored for preferably nine different zoom levels.

In order to calibrate the objectives, they are used on a reference zoom system, the real objective data are determined and a distortion correction is performed.

When correcting distortion, the distortion model is formed from a reference table by virtue of higher order polynomials being interpolated from positional error vectors at different zoom settings and eleven positional error coefficients being established for each color channel reference image. Additionally, the image steadiness error coefficients can be established, and the zoom motor positions can be acquired for associated magnifications and stored in the distortion model.

The distortion model, that is to say the coefficients, magnifications and possibly further values are stored in a shortened zoom table. This shortened zoom table preferably comprises four lines and contains coefficients of compensation polynomials of preferably third degree, which enable the calculation of the aforementioned values at any magnification.

The shortened zoom table can be extended for any magnification $\beta$ by the use of the following polynomials:

The magnitude of the coefficients of the distortion is to be determined for each zoom position i. A magnification $\beta$ belongs to each zoom position i. The size thereof is to be determined from $\beta$ with the aid of the entries of the shortened zoom table.

Here, the following applies to the distortion correction coefficients a:

$$a_{m,n}(i(\beta)) = a_{m,n}(i^0=1) + a_{m,n}(i^0=2)*\beta + a_{m,n}(i^0=3)*\beta^2 + a_{m,n}(i^0=4)*\beta^3;$$

where m represents the three color channels red, green and blue, and n in each case assumes values from 1 to 11;

and the following applies to the image steadiness correction coefficients I:

$$I_m(i(\beta)) = I_m(i^0=1) + I_m(i^0=2)*\beta + I_m(i^0=3)*\beta^2 + I_m(i^0=4)*\beta^3;$$

where m assumes coordinate values X and Y, and wherein $i^0=1 \ldots 3$ are the values of the reduced zoom table.

Overall, different calibration processes are used.

Figure 3:
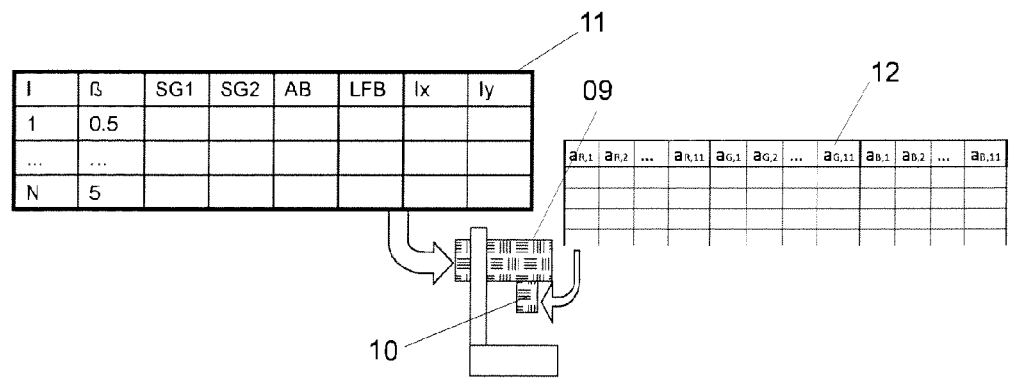
FIG. 3 shows first a calibration logic with a reference zoom system and a reference objective.

First of all, a reference zoom system 09 is adjusted with a reference objective 10 (FIG. 3). In the figures, the reference systems are depicted with shading so that these can be identified better. To this end, calibration masks for the zoom curve, the distortion correction and the image steadiness correction are imaged and used for the corresponding correction when processing the image data.

Using the distortion-corrected image, it is possible to establish a final real magnification ($\beta=0.5 \ldots 5$ or $\beta=5 \ldots 25$) for the reference zoom system for the conjunction with a reference objective.

A zoom table 11 is generated for the combination of reference zoom system with reference objective, and stored in an internal memory of the reference zoom system. A shortened zoom table is stored on the reference objective as calibration table 12 (4×33) for fitting the distortion coefficients.

Figure 4:
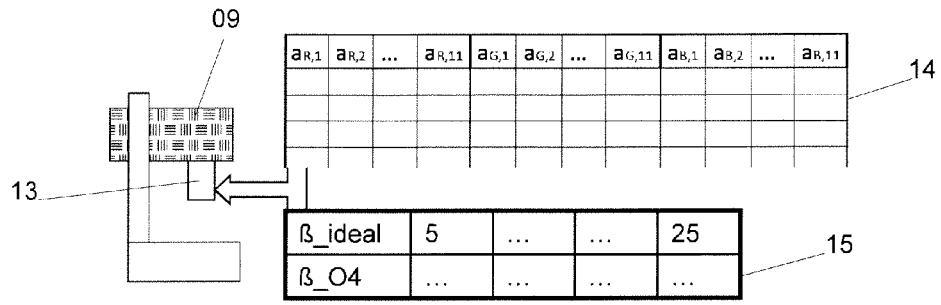
FIG. 4 shows a second calibration logic with a reference zoom system and an arbitrary objective.

FIG. 4 depicts how an arbitrary objective 13 is calibrated on the reference zoom system 09.

Using the reference zoom system 09, the nine ideal $\beta$-positions of the models are approached and the actually deviating, distortion-corrected magnification of the objective 13 is established on the reference zoom system 09 and stored as calibration data 15 on the internal memory of the objective 13. Here, the $\beta$-positions are the magnifications for which the reference patterns were manufactured. Optionally, it is also possible to store the image jump when changing from the reference objective 10 to the new objective 13 as a vector on the internal memory of the objective 13. This value can subsequently be processed further.

The distortion is corrected by way of the ideal magnification. To this end, model coefficients are stored, in a table 14 in an internal memory of the objective, for four ideal magnifications per color channel 11.

Figure 5:
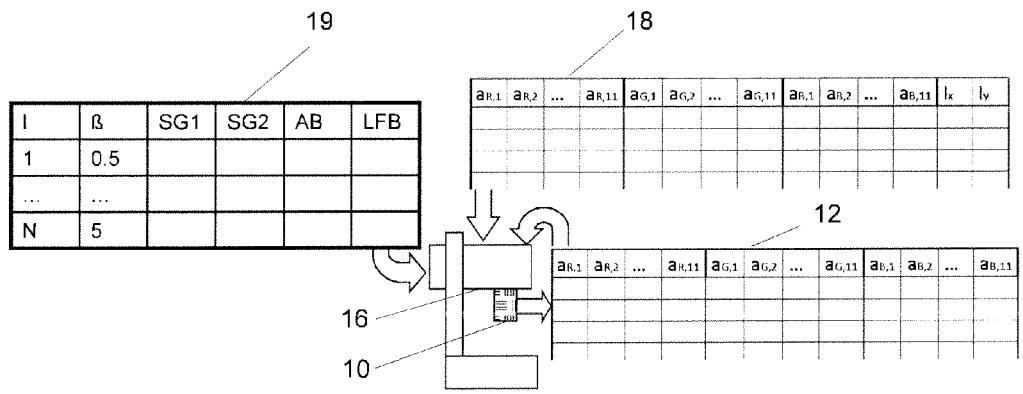
FIG. 5 shows a third calibration logic with an arbitrary zoom system and a reference objective.

FIG. 5 is used to describe how an arbitrary zoom system 16 is calibrated on the reference objective 10. The calibration table 12 of the reference objective 10 with the reference zoom system is stored on the test zoom for subsequent calculations. The steps of determining the fixed point, determining the 9 zoom positions for focused imaging, imaging the calibration masks for the zoom curve, correcting the distortion and correcting the image steadiness as described in FIG. 3 for the combination of reference zoom 09 with reference objective 10 are performed. The movements of the field stop and the aperture stop are established. With the distortion correction, the final magnification $\beta$ is created on the connection of the reference objective with the zoom system.

The model 18 with the distortion coefficients $a_{m,n}$ and the coefficients for the image steadiness correction I is established via $\beta_{ideal}$ and stored on the zoom system in a 4×35 matrix.

A reduced zoom table 19, comprising $\beta_{ideal}$, the positions of the movable lens groups 02, 03, or the corresponding motor increments thereof, of the field stop and aperture stop, is likewise stored on the zoom system.

Figure 6:
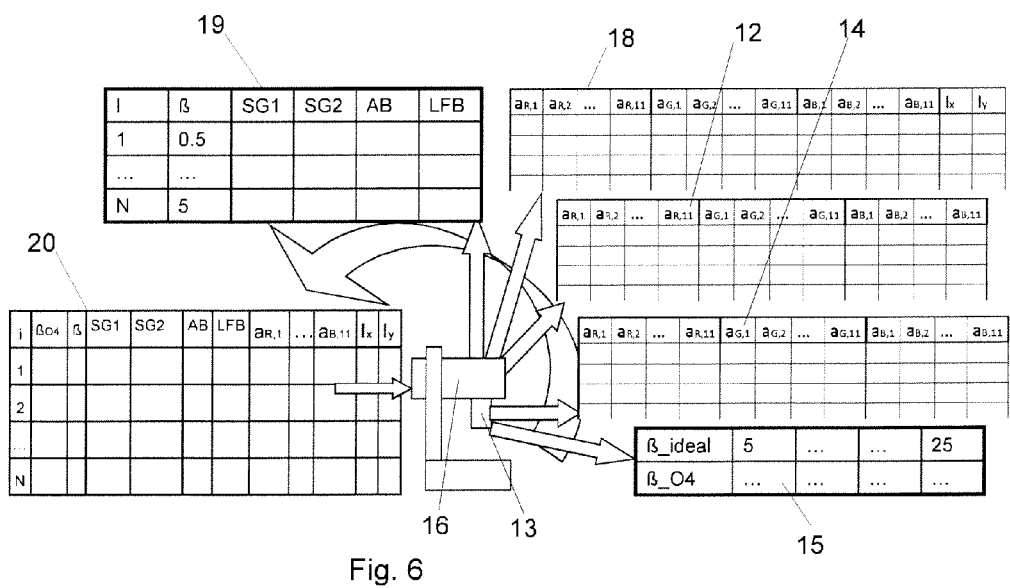
FIG. 6 shows a fourth calibration logic with an arbitrary objective on an arbitrary zoom system.

FIG. 6 is used to explain the procedure if an arbitrary zoom system 16 is intended to be calibrated with the arbitrary objective 13. It should be noted in this respect that all zoom systems and all objectives were calibrated with a reference counterpiece and the corresponding tables are stored in the respective internal memories, as explained above.

The tables or models 12, 18, 19 are read from the internal memory of the zoom system 16. The tables 14, 15 are read from the internal memory of the objective 13.

A lookup table 20 for the specific combination of zoom system 16 and objective 13 is created in the optical engine by virtue of a column $\beta_O$ being added to the zoom table 19. Here, the column for the objective magnification $\beta_O$ is obtained by a spline interpolation from the β-calibration table 15. It is available for controlling the zoom and for evaluating image data.

The nine distortion correction coefficients are calculated from the established coefficients as $C\_Z + O_R([C\_Z_R + O_R]^{-1} (C\_Z_R + O \text{ (images of Z on O)}))$.

To this end, an overall imaging correction is considered abstractly as successive execution of individual imaging levels with associated correction. The correction of the image of the objective 13 on the reference zoom 9 ($C\_Z_R + O$), characterized by table 14, is to be applied to the images of the zoom system 16 with the objective 13. This is followed by the application of the inverse correction of the reference objective 10 to the reference zoom 09 $[C\_Z_R + O_R]^{-1}$, characterized by the calibration table 12, and, subsequently, application of the correction of the reference objective 10 to the zoom system 16 $C\_Z + O_R$, characterized by the model 18.

The calculation of distortion correction coefficients for carrying out the above-described three partial corrections in succession in a single distortion correction step is brought about by virtue of the image coordinates of the holes 08 running through the correction steps and coefficients of the positional deviation being established from the final coordinates, preferably for 9 magnifications and three wavelengths (color channels). The zoom table is calculated by means of fitted coefficients using β, analogously to the reduced zoom tables.

Establishing the distortion correction model is based on: "The Worst Distortions of Astrometric Instruments and Orthonormal Models for Rectangular Fields of View", Valeri V. Makarov, Daniel R. Veillette, Gregory S. Hennessy, & Benjamin F. Lane; United States Naval Observatory, 3450 Massachusetts Ave. NW, Washington, D.C.

For objectives with other magnifications, such as e.g. 1.6× or 0.5×, distortion coefficients are established analogously on the reference zoom system and fitted with the respective standard β, $\beta = \beta_{ideal}*(32.9/99)$ or $\beta = \beta_{ideal}*(32.9/300)$. The magnification transformation table and the distortion fit coefficient table are respectively stored in the internal memory of the objective 13. The overall lookup table is now generated precisely as described above in an exemplary manner for a 5× objective. Only the overall magnification is calculated in an accordingly different manner.

A person skilled in the art can easily establish and apply the analogies.

It also lies within the scope of the invention optionally to select other storage locations for the calibration data of the objective and of the zoom system. By way of example, it would be conceivable to store an ID on the respective internal memory and to store the associated tables in a central database.

Advantageously, the last ten (or any other number of) lookup tables of the last ten (x) connected objectives are stored in a history. This ensures immediate work using the purchased objectives, even in the case of relatively frequent interchange. The history can naturally be adapted to the required conditions and may contain more than ten entries or fewer.

The description is construed in an exemplary manner for a system with two zoom movements with direct drives and with field stop and aperture stop diameters which vary with the zoom. These entries are not mandatory for implementing the concept. The corresponding entries can be dispensed with for zoom systems without these. In an exemplary manner, SG1 and SG2 represent zoom systems with two direct drives, in place of positions of the drive. The latter can be replaced by motor position, encoder position, mechanical latching or differently designed transducers with known technical means.

The content of the invention is also retained if the content of the lookup table 20 is realized by a zoom table analogous to 11, complemented by a column β_O4, and a reduced zoom table analogous to 12.

Although some of various drawings illustrate a number of logical stages in a particular order, stages which are not order dependent can be reordered and other stages can be combined or broken out. Alternative orderings and groupings, whether described above or not, can be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

This application is based on and claims the benefit of priority from German Patent Application No. 10 2013 012 987.7, filed on Aug. 3, 2013, the contents of which are incorporated by reference.

LIST OF REFERENCE SIGNS

01 Zoom system
02 First movable lens group
03 Second movable lens group
04 Object
05 Objective
06 Image sensor
07 Grid reference object
08 Hole
09 Reference zoom system
10 Reference objective
11 Zoom table
12 Calibration table
13 Objective
14 Table 15 Calibration table
16 Zoom system
17 -
18 Model
19 Reduced zoom table
20 Lookup table

We claim:

1. A method for calibrating a digital optical instrument which comprises at least a motorized or encoded zoom system, an objective, an image sensor and an image processing unit, comprising the following steps:
    establishing calibration data ($D_{ZRef}$) of the zoom system with a reference objective and storing these in an internal memory of the zoom system;
    establishing calibration data ($D_{ORef}$) of the objective with a reference zoom system and storing these in an internal memory of the objective;
    reading the internal memories of the zoom system and of the objective and applying a digital-optical correction of an image acquired by an image sensor with the calibration data ($D_{ZRef}$) and ($D_{ORef}$).

2. The method as claimed in claim 1, wherein a calibration of the reference zoom system with the reference objective is performed first, wherein a calibration table is stored on the reference objective and a zoom table is stored on the reference zoom system.

3. The method as claimed in claim 1, wherein the calibration data ($D_{ZRef}$) comprise a real zoom curve and an aberration model with correction coefficients, wherein a real magnification is established from a distortion-corrected image.

4. The method as claimed in claim 1, wherein the calibration data ($D_{ZRef}$) comprise an actual deviating, distortion-corrected magnification ($\beta_O$) of the objective for specific ideal magnifications ($\beta_{Ideal}$) of the zoom system.

5. The method as claimed in claim 1, wherein the calibration data are combined where:
    there is a correction of the image of the objective on the reference zoom system;
    there is an inverse correction of the reference zoom system on the reference objective to the previously established data; and
    there is a correction of the image of the reference objective on the zoom system to the previously established data.

6. The method as claimed in claim 1, wherein the calibration data ($D_{ZRef}$) the zoom system comprise a zoom table with values of a corrected zoom value.

7. The method as claimed in claim 6, wherein the calibration data ($D_{ZRef}$) of the zoom system comprise correction coefficients for correcting the distortion.

8. The method as claimed in claim 6, wherein the calibration data ($D_{ZRef}$) of the zoom system comprise correction coefficients for correcting the image steadiness.

9. The method as claimed in claim 1, wherein the calibration data ($D_{ORef}$) of the objective comprise magnification correction coefficients.

10. A digital optical instrument comprising at least a motorized or encoded zoom system, an objective, an image sensor and an image processing unit, wherein calibration data ($D_{ZRef}$) stored in an internal memory of the zoom system and calibration data ($D_{ORef}$) are stored in an internal memory of the objective, which calibration data in each case comprise correction coefficients for correcting distortion and for correcting magnification, which serve for calibrating the digital optical instrument.

* * * * *